United States Patent [19]
Delin et al.

[11] 3,864,088
[45] Feb. 4, 1975

[54] APPARATUS FOR DETERMINING THE CONTENT OF ORGANIC SUBSTANCES IN WATER

[75] Inventors: Heinz Delin, Wedel/Holstein; Werner Voss, Hamburg, both of Germany

[73] Assignee: H. Maihak A.G., Hamburg, Germany

[22] Filed: Mar. 5, 1974

[21] Appl. No.: 448,380

[30] Foreign Application Priority Data
Mar. 6, 1973 Germany.................... 7308398[U]

[52] U.S. Cl............... 23/253 PC, 219/273, 219/275
[51] Int. Cl...................... G01n 25/00, G01n 33/18
[58] Field of Search.......... 23/253 PC, 230 PC, 264, 23/288 J; 219/273, 275; 21/119

[56] References Cited
UNITED STATES PATENTS

| | | | |
|---|---|---|---|
| 2,244,180 | 6/1941 | Williams et al. | 21/119 |
| 2,772,318 | 11/1956 | Holland | 219/275 |
| 2,888,332 | 5/1959 | Aites | 23/253 PC |
| 2,932,558 | 4/1960 | Bennet | 23/230 PC |
| 3,128,619 | 4/1964 | Lieberman | 23/230 PC |

Primary Examiner—Robert M. Reese
Attorney, Agent, or Firm—Michael S. Striker

[57] ABSTRACT

A crucible has an upper end provided with an inlet for drops of water, and a bottom wall. An impact plate is arranged adjacent to but upwardly spaced from the bottom wall and so positioned that drops of water drip onto the impact plate and become fragmented into smaller droplets. A layer of a non-caking particulate material is provided on the bottom wall beneath the impact plate, so that the droplets fall onto the layer. A heating arrangement heats the region of the impact plate and of the layer, so that the droplets become vaporized and organic substances present in them become combusted and form $CO_2$. The water vapor and the $CO_2$ carried thereby are discharged to the exterior of the crucible for analysis of the $CO_2$ content in a gas analyzer.

8 Claims, 2 Drawing Figures

APPARATUS FOR DETERMINING THE CONTENT OF ORGANIC SUBSTANCES IN WATER

BACKGROUND OF THE INVENTION

The present invention relates to an apparatus for determining the content of organic substances in water.

It is already known from the prior art to provide an arrangement for continuously determining the organic pollutants in water. The water which is to be tested is continuously supplied into the apparatus wherein it is freed of carbon that may be present in form of carbonates or bicarbonates. Thereupon, the water is vaporized and supplied into a chamber filled with a catalyzer and in which the organic carbons still present in the water are combusted to form $CO_2$. The water vapor carrying along the thus-formed $CO_2$ is admitted into a cooler where the water vapor is condensed whereas the $CO_2$ is entrained with a stream of carrier gas and supplied to a gas analyzer.

The device according to the prior art is operative for its intended purpose, but has certain disadvantages which make improvements highly desirble. Firstly, the crucible is of quartz glass which is in the presence of alkali ions tends to recrystallize at high temperatures, forming a cristobalite layer which makes the crucible unusable. The impact plate is of a metal, usually silver, having high thermal conductivity. It has been found in operation that the silver tends to become worn and corroded very rapidly under the existing thermal and chemical conditions, so that the device cannot operate for prolonged periods of time without requiring repairs.

The bottom wall of the crucible of quartz glass is smooth. The drops of water impacting the silver impact plate become fragmented into droplets which fall onto this smooth bottom wall and which are each surrounded by an insulating steam layer which delays the proper evaporation of the droplet and the combustion of carbon contained in it, so that strong fluctuations in the indication of carbon concentration are observed.

Furthermore, it has been found that in many instances the drops admitted into the crucible will not drop in a vertical patth onto the impact plate. This, in turn, means that the droplets into which each drop becomes fragmented will not uniformly fall onto the bottom wall of the crucible and, due to such non-uniform distribution, at least some of these droplets tends to reunite to form a larger drop which again will evaporate relatively slowly, so that this constitutes another source of fluctuations in the indication of the carbon content.

SUMMARY OF THE INVENTION

Accordingly, it is an object of the present invention to overcome the disadvantages of the prior art.

More particularly, it is an object of the present invention to provide an iproved apparatus of the type in question which avoids these disadvantages.

In keeping with these objects, and with others which will become apparent hereafter, one feature of the invention resides, in an apparatus for determining the content of organic substances in water, in a combination which comprises a crucible having an upper end provided with an inlet for drops of water, and a bottom wall. An impact plate is located adjacent to but upwardly spaced from the bottom wall and so positioned that drops of water drip onto the impact plate and become fragmented thereby into smaller droplets. A layer of non-caking particulate material is provided on the bottom wall beneath the impact plate, so that droplets fall onto the layer. Heating means for heaeting the region of the impact plate and layer is provided, so that the droplets become vaporized on the layer and organic substances in them become combusted and form $CO_2$. Discharging means is provided for discharging the water vapor and $CO_2$ to the exterior of the crucible for analysis of the $CO_2$ content in a gas analyzer.

The crucible itself is of platinum, platinum alloys or a creamic material which is capable of withstanding the thermal and chemical conditions which are encountered. Such ceramic materials are available commercially under the various trade names, for instance "Alsint" and "Degussit." They are usually 99.5% $Al_2O_3$, and should certainly be composed to at least 95 percent of such material.

The impact plate itself is also of platinum, platinum alloy or the aforementioned ceramic material. The layer of non-caking material is preferably again in form of the aforementioned ceramic material or of quartz glass, in suitable form, advantageously in granulated form. This serves to break up the droplets and prevents the formation of a steam layer about them.

According to the invention the crucible may be adjustably mounted to assure that drops of water dripping from the inlet onto the impact plate will impact the same in a strictly vertical path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
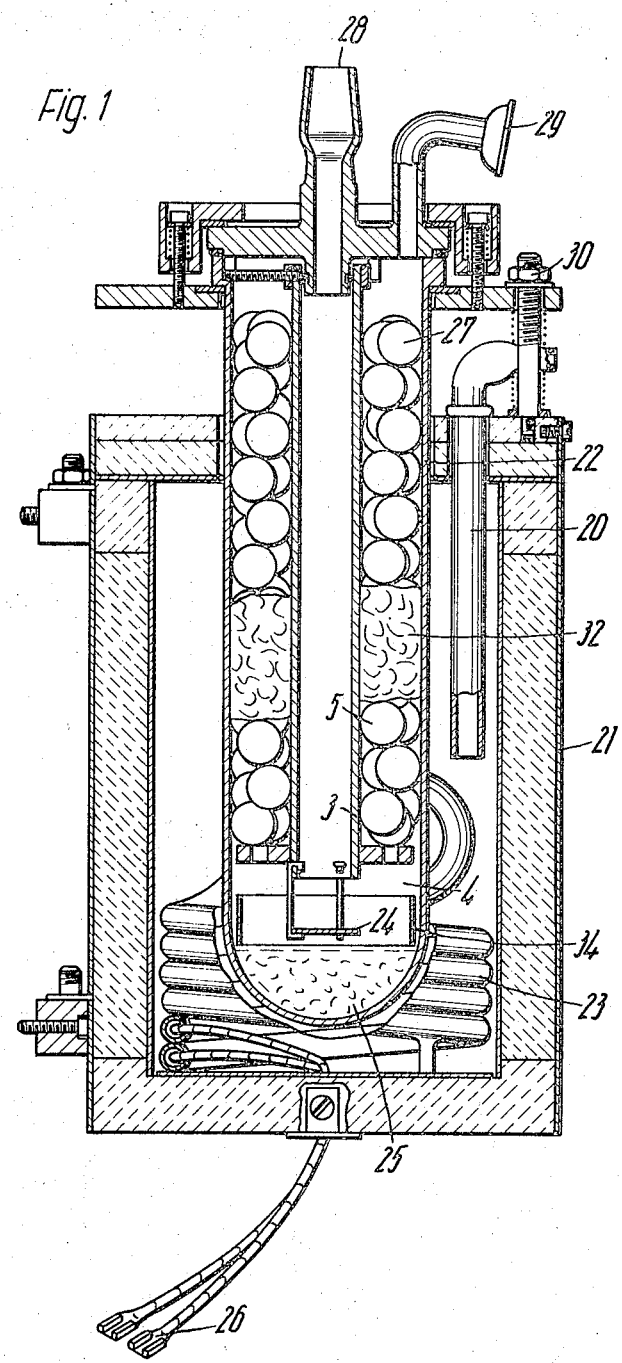
FIG. 1 is a vertical section through an apparatus according to the present invention.

The water to be analyzed in the apparatus of FIG. 1 is continuously admitted via the inlet 28 in form of drops which drip into the crucible 22 of platinum, platinum alloy or ceramic material. The crucible 22 is located within an oven 21 and its interior is heated by means of the electrical heater 23 having the current supply leads 26, to such a temperature that the combustion chamber 4 will be maintained at a temperature level of approximately 800°C.

The drops of water which are admitted fall through a tube 3 onto the impact plate 24 which is also of platinum, platinum alloy or the aforementioned ceramic material. On impact they become fragmented into smaller droplets which jump off the impact plate 24 and fall into the layer 25 of non-caking material. It is advantageous if this material is in granular form, having sharp edges which tend to further fragment the droplets, so that the droplets become rapidly evaporated, to travel as steam into a combustion chamber 5 which in the illustrated embodiment is filled with spherical bodies 27 that may be composed of the same ceramic materials as mentioned earlier, and which also contains a catlyst 32, for instance platinum-rhodium alloys. A protective ceramic baffle 34 surrounds the impact plate 24 to prevent the droplets from impacting the wall of the crucible, and to eliminate damage to the wall.

Adjusting screws 30 are provided, and if desired a spirit level can be employed in addition, to adjust the crucible in such a way that the path traversed by the falling drops as they approach the impact plate 24, will be exactly normal to the surface of the impact plate.

Figure 2:
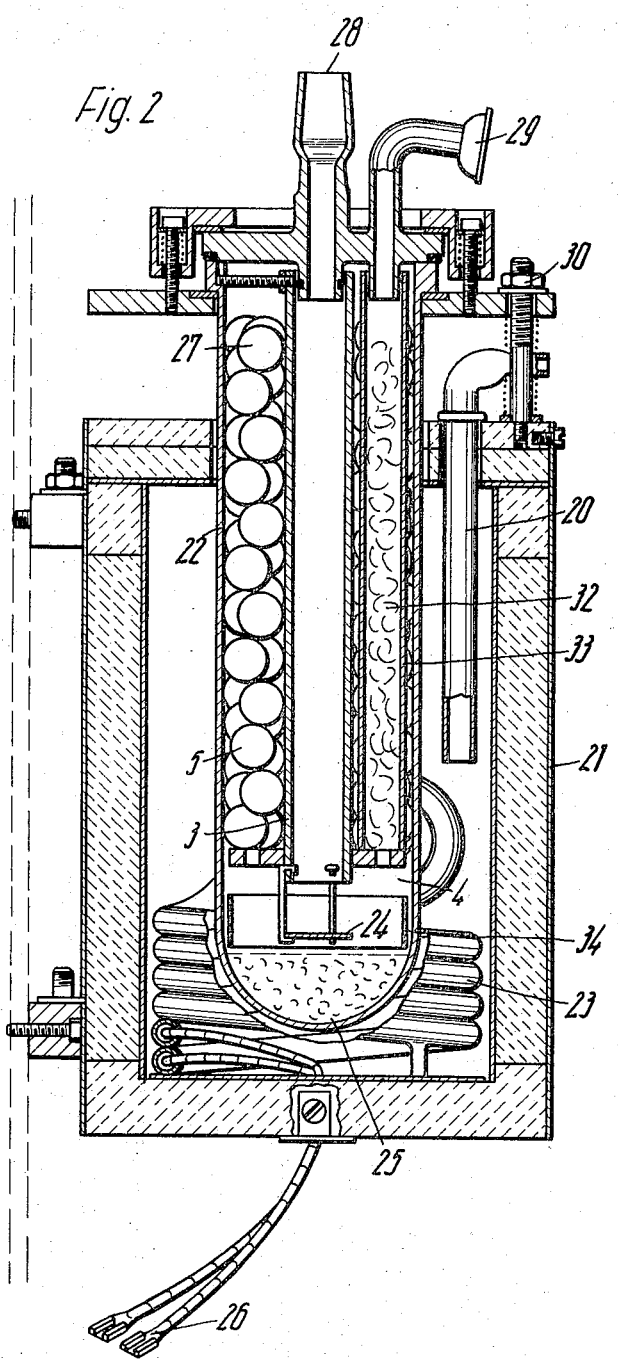
FIG. 2 is a view similar to FIG. 1 but illustrating a somewhat different embodiment.

The embodiment in FIG. 2 is quiet reminiscent of that in FIG. 1, and like reference numerals identify like elements. Here, however, a tube 33 communicates with the combustion chamber 5, and the steam travels through this tube 33 for further analysis. This tube 33 is filled not with the spherical members of FIG. 1, but with a catalyst fiber or wool 32 of platinum-rhodium alloy or the like, and this assures a more even flow of the stream of gases.

In both of the Figures the oven 21 includes a combustion chamber 20 and an outlet 29 from which the gases travel to the gas analyzer. The combustion of carbon takes place in the chamber 5. The chamber 20 serves to combust the hydrocarbons which are contained in the incoming stream of carrier air, since these hydrocarbons would otherwise influence and falsify the measurements obtained, becoming added to the carbon obtained by combusting the organic matter in the water. The $CO_2$ which is developed during combustion of the hydrocarbons in the carrier air is removed by use of an appropriate filter (not shown). The oxygen in the carrier air must be constantly replenished, in order to be able to maintain the combustion of the carbon. Air can be admitted through openings in the furnace 21, which is not sealed with respect to the ambient atmosphere, to reach the chamber 20. The outlet of the tubular chamber 20 communicates in non-illustrated manner with the inlet 28.

It will be understood that each of the elements described above, or two or more together, may also find a useful application in other types of constructions differing from the types described above.

While the invention has been illustrated and described as embodied in an apparatus for determining the content of organic substances in water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

1. In an apparatus for determining the content of organic substances in water, a combination comprising a crucible having an upper end provided with an inlet for drops of water, and a bottom wall; an impact plate adjacent to but upwardly spaced from said bottom wall and so positioned that drops of water drip into said impact plate and become fragmented thereby onto smaller droplets; a layer of non-caking particulate material on said bottom wall beneath said impact plate, so that said droplets fall onto said layer; heating means for heating the region of said impact plate and layer, so that said droplets become vaporized on said layer and organic substances present in them become combusted and form $CO_2$; and discharging means for discharging the water vapor and $CO_2$ to the exterior of said crucible for analysis of the $CO_2$ contents in a gas analyzer.

2. A combination as defined in claim 1; and further comprising a tubular baffle surroundinng said impact plate and being spaced from a circumferential wall of said crucible.

3. A combination as defined in claim 1; and further comprising mounting means said crucible for positional adjustment so as to position a surface of said impact plate which faces upwardly toward said inlet, in a plane which is normal to the path traversed by the drops of water falling from said inlet onto said surface.

4. A combination as defined in claim 1, wherein said material of said layer is a granular material.

5. A combination as defined in claim 4, wherein said granular material is selected from the group composed of ceramics and quartz-glass.

6. A combination as defined in claim 1, wherein said crucible is made from a thermally and chemically resistant material selected from the group composed of platinum, platinum alloys and ceramics.

7. A combination as defined in claim 6, wherein said impact plate is also made from a thermally and chemically resistant material selected from the group composed of platinum, platinum alloys and ceramics.

8. A combination as defined in claim 7, wherein said thermally and chemically resistant material is a ceramic material having an $Al_2O_3$ content of at least 95 percent.

* * * * *